United States Patent [19]
Bell et al.

[11] Patent Number: 5,359,262
[45] Date of Patent: Oct. 25, 1994

[54] SUB-MINIATURE TUNGSTEN HALOGEN LAMP WITH MAJOR INERT GAS AND MINOR HALIDE GAS CONSTITUTES

[75] Inventors: Dean A. Bell, Marcelllus; John W. Harkins, Baldinsville, both of N.Y.

[73] Assignee: Welch Allyn, Inc., Skaneateles Falls, N.Y.

[21] Appl. No.: 938,876

[22] Filed: Aug. 31, 1992

[51] Int. Cl.$^5$ .............................................. H01K 1/50
[52] U.S. Cl. ................................. 313/579; 313/569; 313/643
[58] Field of Search ............... 313/579, 578, 569, 570, 313/637, 643; 445/16, 27

[56] References Cited

U.S. PATENT DOCUMENTS

| | | | |
|---|---|---|---|
| 3,798,491 | 3/1974 | Malm | 313/578 |
| 3,829,729 | 8/1974 | Westlund, Jr. et al. | 313/579 |
| 4,139,794 | 2/1979 | Malm et al. . | |
| 4,163,171 | 7/1979 | Wurster . | |
| 4,241,391 | 12/1980 | Pitkjaan et al. | 313/579 |
| 4,409,516 | 10/1983 | Thomas et al. | 313/579 |
| 4,451,760 | 5/1984 | Griffin et al. . | |
| 4,490,646 | 12/1984 | Bunk et al. . | |
| 4,550,270 | 10/1985 | Kimball et al. | 313/579 |
| 4,598,342 | 7/1986 | English et al. . | |
| 4,629,935 | 12/1986 | Keenan . | |
| 4,629,936 | 12/1986 | Weld et al. . | |
| 4,766,346 | 8/1988 | Weiss et al. . | |
| 4,768,985 | 9/1988 | Hamai | 445/27 |
| 4,777,404 | 10/1988 | Kiesel et al. . | |
| 4,866,340 | 9/1989 | Caems et al. . | |
| 4,897,767 | 1/1990 | T'Jampens . | |
| 5,034,656 | 7/1991 | Yu et al. | 313/579 |

FOREIGN PATENT DOCUMENTS 2527761  6/1975  Fed. Rep. of Germany .
8608090  3/1986  Fed. Rep. of Germany .

Primary Examiner—Donald J. Yusko
Assistant Examiner—Vip Patel
Attorney, Agent, or Firm—Harris Beach & Wilcox

[57] ABSTRACT

A low wattage sub-miniature, tungsten-halogen lamp having high efficacy and long life. The lamp has a cylindrical envelope in the T-1 to T-1¼ range containing a fill gas having a halogen minor constituent and an inert gas major constituent. The lamp operates at high fill gas pressures, and lower halogen gas content.

12 Claims, 4 Drawing Sheets

SUB-MINIATURE TUNGSTEN HALOGEN LAMP WITH MAJOR INERT GAS AND MINOR HALIDE GAS CONSTITUTES

BACKGROUND OF THE INVENTION

This invention relates to a low wattage, tungsten-halogen lamp and, in particular, to a low wattage lamp having improved performance, high efficacy and long life.

As explained in U.S. Pat. Nos. 4,163,171 and 4,451,760, many incandescent lamps employ the well-known tungsten-halogen regenerative cycle. At relatively high operating temperatures, tungsten atoms are evaporated from the filament. These atoms are captured by the halogen gas and return to the filament to replace lost material. A reduction in size of these lamps produces a dramatic increase in thermal loading and a reduction in lamp life and maintenance. Maintenance, as herein used, is defined as the percent of initial lamp light output that is maintained over the life of the lamp. Output, as herein used, is defined as the visible light, 400 to 700 nanometer wavelength, emanating from the lamp. Typically, lamps in the T-1 to T-1¼ range exhibit a marked drop off in maintenance after 15 to 20 hours of operation and generally fail rapidly thereafter.

U.S. Pat. No. 4,598,342 discloses a low wattage, tungsten-halogen lamp that employs a double filament arrangement. The filaments are aligned end to end along the axis of the lamp envelope and each is arranged to operate independently of the other. The coils in each filament are spaced further apart at the center of the filament than at each end to provide for a more uniform temperature distribution along the length of each filament. The double filament arrangement increases the thermal loading on the lamp when both filaments are operating. To compensate for the higher than normal loading, the fill gas pressure in the lamp is increased anywhere from 2 to 20 atmospheres. The fill gas contains Xenon which is said to maintain the inactive filament at a cooler temperature (i.e. the one filament is turned off). This prevents halogen in the fill gas from attacking the filament components. The patent does not disclose the fractional percentage of halogen gas contained in the Xenon gas.

SUMMARY OF THE INVENTION

It is the primary object of this invention to improve tungsten-halogen lamps and, in particular, sub-miniature lamps of this type.

A further object of the present invention is to improve the life of small tungsten-halogen lamps.

A still further object of the present invention is to improve the maintenance of sub-miniature, tungsten-halogen lamps.

Yet a further object of the present invention is to provide a tungsten-halogen lamp for use in sub-miniature applications which has a very high efficacy.

Another object of the present invention is to provide a high output, high color temperature, high maintenance, long-life lamp for sub-miniature applications.

These and other objects of the invention are attained by a sub-miniature, tungsten-halogen lamp in the T-1¼ to T-1 range having a sealed chamber containing a fill gas at a pressure of between 3.5 and 30 atmospheres. The fill gas contains a minor halogen gas constituent and major inert gas constituent, minor and major referring to percent composition. Enhanced lamp performance is obtained by altering the halogen content in the fill gas in relation to the pressure maintained within the lamp.

BRIEF DESCRIPTION OF THE DRAWINGS

For a better understanding of these and other objects of the present invention, reference shall be made to the following description of the invention which is to be read in conjunction with the accompanying drawing, wherein.

DESCRIPTION OF THE INVENTION

The present invention relates to a tungsten-halogen lamp having an extremely long operating life and greatly enhanced performance and is particularly well suited for use in sub-miniature applications. Sub-miniature lamps of this type generally fall in the T-1 to T-1¼ size range. Each whole number in the lamp designation represents a lamp diameter equal to 0.125 inches. Sub-miniature lamps of this nature found in prior art typically exhibit a relatively short operating life and reduced lamp maintenance. The average life of these prior art lamps is typically about one hundred hours. As will be explained in greater detail below, the present lamp is designed to operate at high fill gas pressures and with a lower than normal halogen gas content. It has been found that by increasing the internal pressure of the lamp, while at the same time reducing the amount of halogen contained in the fill gas, a rather dramatic increase in sub-miniature lamp performance is achieved.

Figure 1:
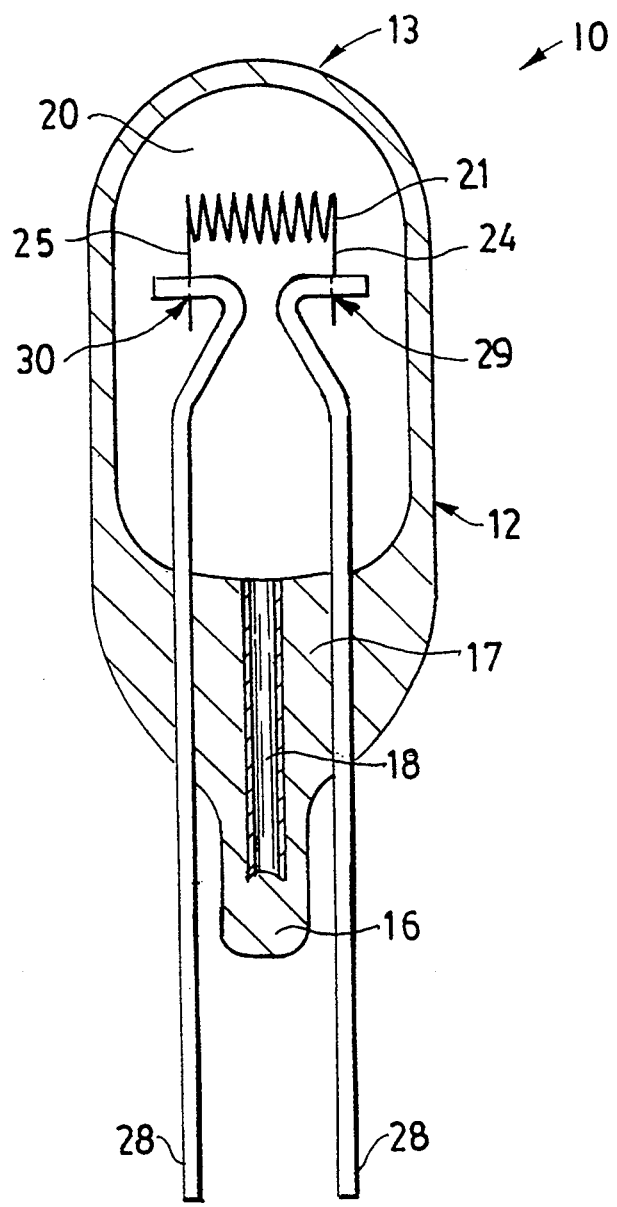
FIG. 1 is an enlarged side elevation of a sub-miniature, tungsten-halogen lamp embodying the teachings of the present invention.

With reference to FIG. 1, there is shown a sub-miniature lamp, generally referenced 10, that embodies the teachings of the present invention. The lamp is formed of high temperature glass, preferably an aluminosilicate glass, capable of withstanding high internal gas pressures and high operating temperatures. The lamp includes a cylindrical envelope 12 that terminates at its distal end in an arcuate-shaped dome 13, or lens. The opposite end or base of the envelope is melted to form a full glass seal 17 around the lead wires 28 and around an aluminosilicate glass tube 18 through which the lamp is evacuated and filled with gas. The glass tube 18 is pinched or tipped off at 16 to contain the fill gas within the lamp.

The envelope encloses a chamber 20 containing a coiled tungsten filament 21. The two ends 24 and 25 of the filament are placed on or across the formed end of the lead-in wires 28 and swagged or welded in place at 29 and 30. The lead wires 28 are brought out of the envelope through the sealed base and are terminated approximately 1 inch from the lamp. The lead wires preferably are formed of molybdenum. Although not clearly shown in the drawing, the coils of the tungsten filament are uniformly spaced along the entire length of the filament.

Figure 2:
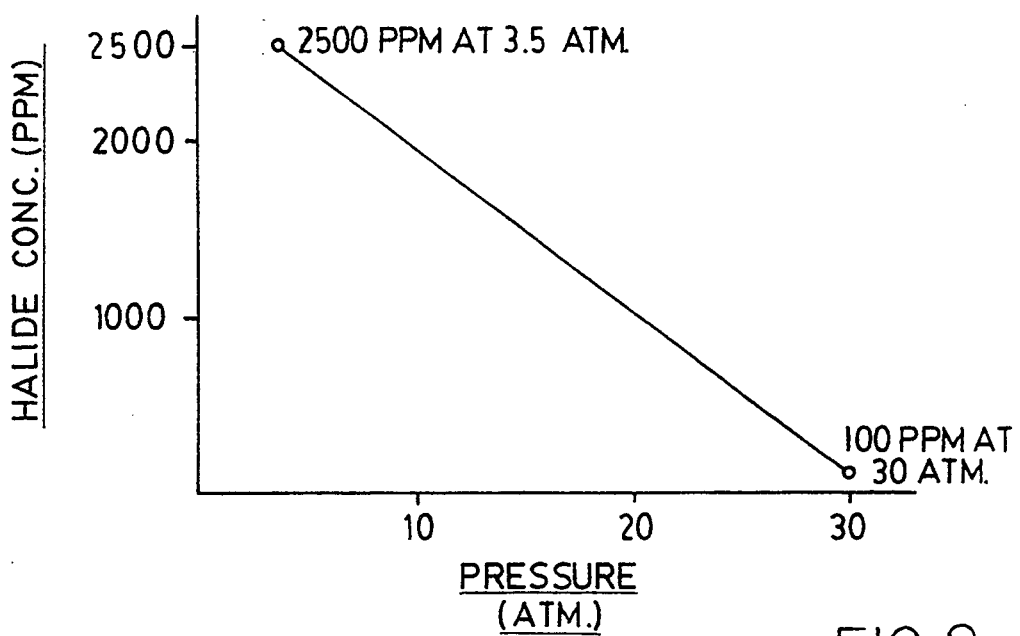
FIG. 2 is a graphic representation in which the internal pressure of the lamp shown in FIG. 1 is compared to halogen gas content.

The envelope chamber 20 contains a fill gas having a minor halide constituent by percent composition and a major inert gas constituent of preferably high molecular weight such as Xenon or Krypton gas. It has been found that by raising the internal pressure of the lamp, while at the same time reducing fractional percentages of halogen contained in the fill gas, the performance of the lamp is greatly enhanced when compared to similar sub-miniature lamps found in the art. With reference to FIG. 2, there is shown graphically the relationship of halide concentration to fill gas pressure utilized in a T-1 or T-1¼ lamp. A near linear relationship between halide concentration and pressure is maintained across the desired pressure range of 3.5 atmospheres and 30.0 atmospheres. At the low end of the range, the fill gas contains 2500 parts per million (ppm) of halide gas, while at the upper end of the range the halogen content is reduced to 100 ppm. Tests conducted on lamps exhibit higher lumens per watt, higher light output, greater maintenance and an extended life. The specific halide selected is dependent upon the lamp duty cycle, degree of heat loss or sinking, thermal loading, filament mass and desired operating life of the lamps. The fill gas composition and the internal fill gas pressure are dependent upon the desired color temperature, lamp wattage, maintenance and again expected lamp life.

Empirical results end calculations based on these results indicate clearly that tungsten-halogen lamps in T-1 to T-1¼ size configurations are capable of operating within the following performance ranges:

2.0 to 8.0 volts
1.0 to 7.5 watts
0.5 to 12.0 mean spherical candlepower (MSCP)
2600K to 3400K color temperature
10 to 20,000 hours of life In addition, these lamps have provided up to 20 lumens per watt (LPW) light output and have given in excess of 100% maintenance of initial light output.

Figure 3:
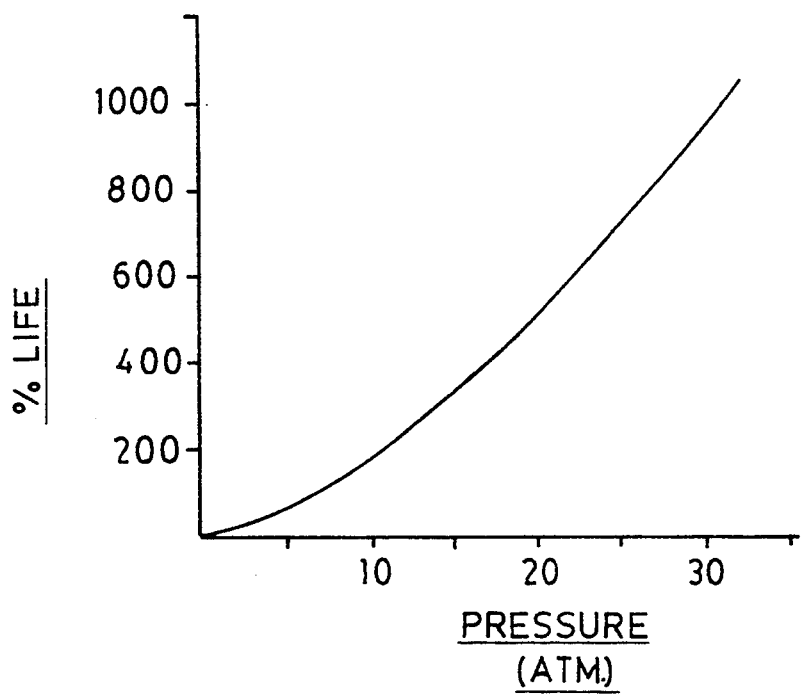
FIG. 3 is a graphic representation in which the life of the lamp is compared to the internal fill gas pressure of the lamp.

Referring now to FIG. 3, there is shown graphically the percentage increase in the present lamp's life with increases in pressure and corresponding decreases in halogen gas as illustrated in FIG. 2. As can be seen, there is a dramatic increase in lamp life as the internal fill gas pressures increase. Lamps that normally would be expected to provide hundreds of hours or less of life might now be expected to provide thousands of hours of operation at the higher pressures and lower halogen concentrations as herein described.

A T-1 lamp of the type described above with a lens at its distal end was filled with a Krypton gas as the major constituent and a minor halogen constituent at a concentration level of 2500 parts per million (ppm) of the total gas constituents. The lamp fill gas pressure was set at 15 atmospheres.

Figure 4:
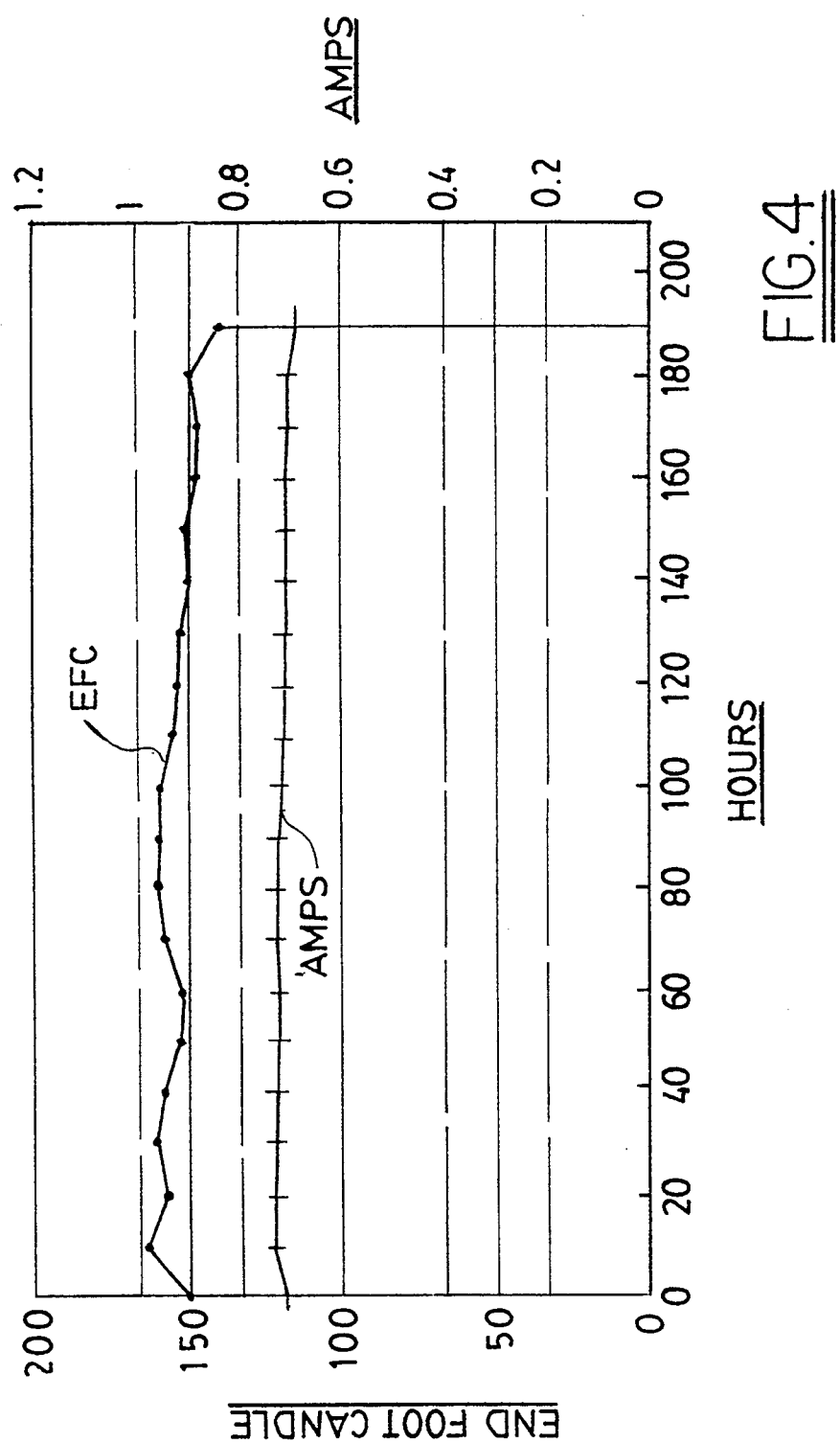
FIG. 4 is a graphic representation in which the output and current consumption of the lamp are plotted against operating time.

The lamp was initially activated at 3.50 volts, with 2.7 MSCP and the illumination at the lens was measured as 150 foot candles. As shown on the graph depicted in FIG. 4, failure occurred after about 180 hours of operation. This test was conducted to ascertain changes in maintenance and power input over the operating period. The initial current loading was noted as being 0.72 amps. The output of the lamp increased during the first 10 hours of operation after which it declined very slightly, The lamp exhibited 101% maintenance at 70 percent and 98% maintenance at 95 percent of its actual life. Similarly, the current drawn by the lamp rose slightly within the initial 10 hours of operation and remained within ±3 percent of initial reading throughout the entire lamp life. Similarly, the lamp exhibits improved life, while substantially maintaining a near constant light output over the life of the lamp. Clearly, the maintenance of the lamp is far beyond that of similar size lamps found in the prior art. Additionally, the life of the lamp is far beyond that of prior art lamps which would be expected to yield 15 to 40 hours of life.

A T-1¼ lamp of the type described above with a lens at its distal end was filled with a Krypton gas as the major constituent and a minor halogen constituent at a concentration level of 1250 parts per million (PPM) of the total gas constituents. The lamp fill gas pressure was set at 12 atmospheres.

Figure 5:
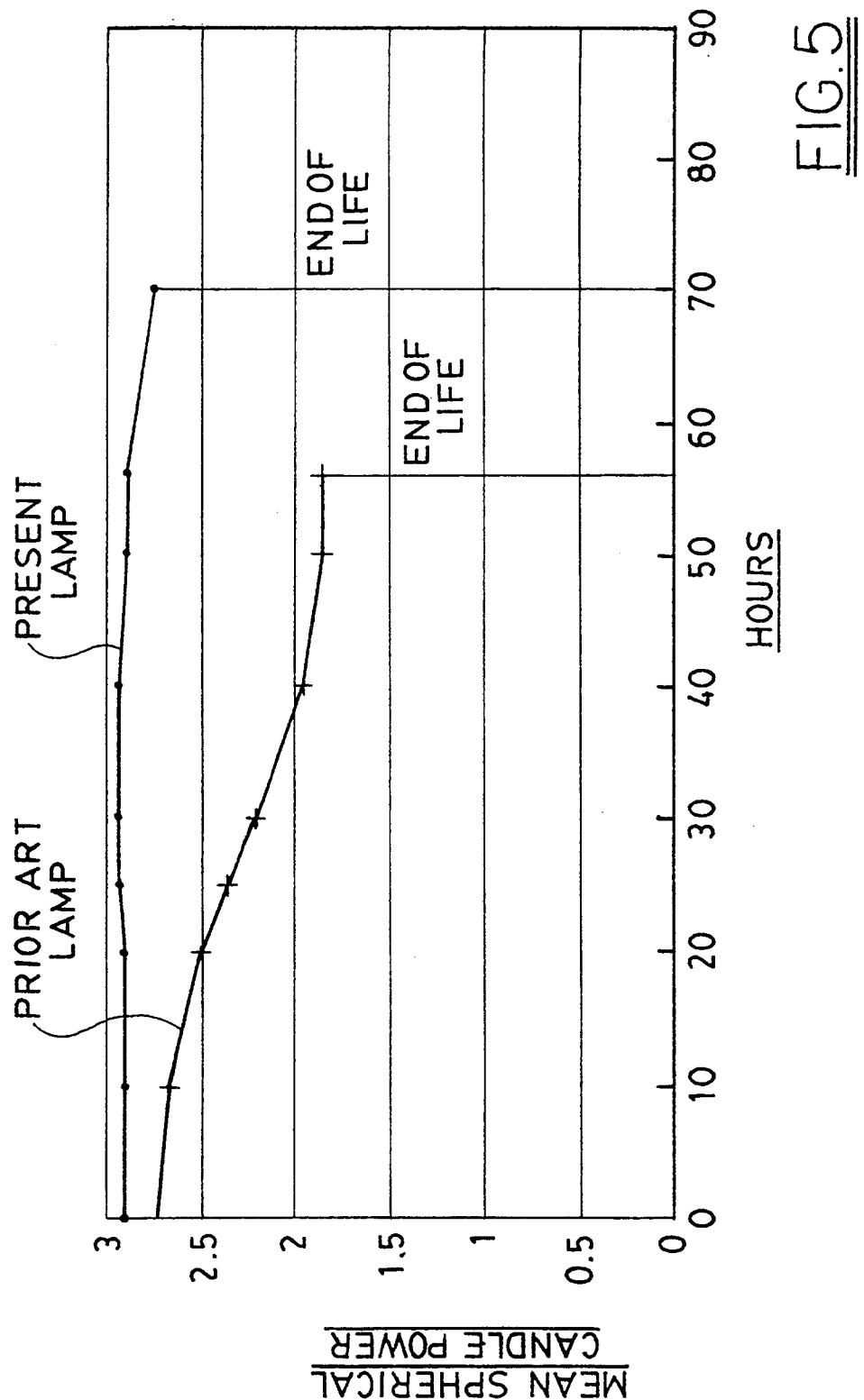
FIG. 5 is a graphical representation in which the life and maintenance of the lamp is compared to a lamp of prior art.

The lamp was initially activated at 3.50 volts with initial current draw of 0.740 amperes and initial light output of 2.90 MSCP with an efficacy of 14 lumens per watt. The maintenance of this lamp as depicted in FIG. 5 and as compared to a lamp of known prior art shows a 6.6% higher initial light output. At 50 hours of operation, the lamp of the present design herein described was 56% higher in light output as compared to the lamp of known prior art and had 25% longer life, 70 hours as compared to 56 hours. At 70% of actual life, the lamp of the present design described herein had 99.3% of initial light output as compared to 71.7% of initial light output for the lamp of known prior art. Clearly, the maintenance and life of the lamp as herein described is far beyond that of similar size lamps found in the prior art. Such a lamp provides the user with far more utility, useable light output over time.

While this invention has been described with reference to the structure disclosed herein, it is not confined to the details set forth and this application is intended to cover any modifications and changes as may come within the scope of the following claims:

What is claimed is:

1. A sub-miniature, halogen lamp comprising:
a cylindrical envelope formed of high temperature glass having a sealed chamber capable of withstanding internal pressures of between 3.5 and 30 atmospheres, the diameter of said cylindrical envelope being equal to or less than 0.16 inches;
at least one refractory metal filament mounted within said sealed chamber, said at least one refractory metal filament being connected to a pair of leads passing out of the envelope;
a fill gas contained within said sealed chamber at a pressure of between 3.5 and 30 atmospheres;
said fill gas containing an inert gas major constituent and a halide gas minor constituent, the fractional percentage of halide gas being linearly related to the pressure of said fill gas and varying within the range of from 2500 ppm at 3.5 atmospheres to 100 ppm at 30 atmospheres so that the lamp produces an efficacy of up to 20 lumens per watt when operating within a range of from 1.0 and 7.5 watts.

2. The lamp of claim 1 wherein the diameter of the lamp is within a range of about 0.100 and 0.160 inches.

3. The lamp of claim 1 wherein the major gas constituent is Krypton or Xenon,

4. The lamp of claim 1 wherein the envelope is formed of an aluminosilicate glass and the filament is formed of tungsten.

5. A sub-miniature, tungsten-halogen lamp comprising:

a glass envelope containing a sealed chamber capable of withstanding internal gas pressure greater than atmospheric, said glass envelope having a diameter in a range between 0.100 and 0.160 inches;

at least one tungsten filament mounted within said sealed chamber, said least one tungsten filament being connected to a pair of leads passing out of said sealed chamber;

a fill gas contained within said chamber at a pressure within a range of 3.5 atmospheres and 30 atmospheres;

said fill gas including an inert gas major constituent and a halide gas minor constituent, the fractional percentage of halide gas in the fill gas varying linearly within the pressure range from 2500 ppm at 3.5 atmospheres to 100 ppm at 30 atmospheres so that the lamp yields in excess of 100 percent maintenance of initial light output when operated within a range of from 1.0 and 7.5 watts.

6. The lamp of claim 5 having an efficacy of up to 20 lumens per watt.

7. The lamp of claim 5 wherein the envelope is formed of an aluminosilicate glass.

8. The lamp of claim 5 wherein the major gas constituent is Krypton or Xenon.

9. The lamp of claim 5 having a lens or shaped dome at the top end of the envelope and a formed seal at the bottom end.

10. The lamp of claim 9 wherein the leads pass out of the lamp chamber through the formed seal.

11. The lamp of claim 10 wherein the envelope is formed of an aluminosilicate glass.

12. The lamp of claim 5 wherein the glass envelope further includes a glass tube through which fill gas is delivered in said chamber, said tube being pinched or tipped off after filling to seal said chamber.

* * * * *